United States Patent [19]

Irikura et al.

[11] Patent Number: 5,267,477
[45] Date of Patent: Dec. 7, 1993

[54] CARRIER WITH POWER TAKE-OFF DEVICE

[75] Inventors: Koji Irikura, Kobe; Hideaki Okada, Takarazuka; Norihiro Ishii, Itami; Toshiyuki Hasegawa, Ashiya, all of Japan

[73] Assignee: Kanzaki Kokyukoki Mfg., Co. Ltd., Hyogo, Japan

[21] Appl. No.: 928,437

[22] Filed: Aug. 12, 1992

[51] Int. Cl.$^5$ ............................................. F16H 37/00
[52] U.S. Cl. ................................ 74/15.6; 74/15.66; 180/53.1
[58] Field of Search .............. 74/15.6, 15.66, 606 R; 180/53.1, 53.6, 233

[56] References Cited

U.S. PATENT DOCUMENTS

| | | | |
|---|---|---|---|
| 2,395,108 | 2/1946 | Donley et al. | 180/53.1 X |
| 2,464,059 | 3/1949 | Roos et al. | 74/15.6 |
| 2,482,110 | 9/1949 | Hill | 180/53.1 X |
| 2,488,741 | 11/1949 | Rosenthal et al. | 180/53.1 X |
| 2,506,671 | 5/1950 | Jacobi | 74/15.66 |
| 3,083,782 | 4/1963 | Ivaldi | 180/53.1 X |
| 4,579,183 | 4/1986 | Irikura et al. | 74/15.6 X |

FOREIGN PATENT DOCUMENTS 63-3852 1/1988 Japan .

Primary Examiner—Allan D. Herrmann
Assistant Examiner—David W. Laub
Attorney, Agent, or Firm—Larson and Taylor

[57] ABSTRACT

A carrier has a rear wheel driving transmission which comprises a drive shaft extending longitudinally of the body of the carrier, and an output shaft disposed approximately horizontally away from an intermediate shaft below the drive shaft. This arrangement renders the transmission flat, thereby making it possible to position a power take-off device in a clearance between the transmission and a body frame. Consequently, the rear wheels of the carrier can be arranged at a rearward portion of the body, with the engine and load carrying platform of the carrier positioned at a low level, to give improved running stability to the carrier.

5 Claims, 4 Drawing Sheets

CARRIER WITH POWER TAKE-OFF DEVICE

BACKGROUND OF THE INVENTION

1. Field of the Invention

The present invention relates to a carrier with a power take-off device.

2. Description of the Prior Art

Structures are already known for attaching to carriers a power take-off device for driving a fertilizer applicator or the like as connected to a rear portion of the carrier. Such a structure is disclosed, for example, in Examined Japanese Utility Model Publication SHO 63-3852.

It is desired that the power take-off device to be attached to carriers be disposed below the load carrying platform of the carrier inwardly thereof so as not to project rearward from the platform and to thereby preclude deformation of or damage to the device when the rear end of the carrier strikes against articles. However, the carrier disclosed in the above publication has an arrangement wherein the power take-off device is provided in a space formed below a rear portion of the load carrying platform, and a rear wheel driving transmission is disposed to the front of the device. The transmission has the output shaft of an engine, i.e., a drive shaft, extending transversely of the carrier body to project outward from the transmission case and coupled to the take-off device by a belt. Consequently, this arrangement has the following drawbacks. First, since the space specifically used for the power take-off device is provided below the platform rear portion, the rear wheels are arranged toward the front. Second, the drive shaft needs to be disposed at a higher level than the rear axle to preclude the belt coupling the drive shaft to the power take-off device from interfering with the axle, so that the engine must be positioned at a high level, making it impossible to provide the load carrying platform at a low level. Third, the first and second drawbacks further impair the stability of the carrier during running.

SUMMARY OF THE INVENTION

An object of the present invention is to provide a carrier which has rear wheels arranged more rearward, and an engine and a load carrying platform positioned at a lower level than in the prior art and which is thereby given improved stability during running.

To fulfill the above object, the present invention provides a carrier having a body frame, a load carrying platform disposed on a rear portion of the body frame, a rear wheel driving transmission disposed below the platform with a clearance formed between the body frame and the transmission, and a clutch and an engine arranged to the front of the transmission, wherein the transmission comprises a drive shaft extending longitudinally of the body of the carrier and connected to the clutch, an intermediate shaft disposed below the drive shaft in parallel thereto and operatively connected to the drive shaft, a wheel driving output shaft positioned approximately horizontally away from the intermediate shaft in parallel thereto and operatively connected to the intermediate shaft, and a power take-off gear rotatable with the drive shaft, a power take-off device being provided in the clearance between the body frame and the transmission and comprising an input shaft coupled to the power take-off gear of the transmission, and an output shaft for an external device.

The carrier embodying the invention and having the construction described above has the following advantages. Below and in parallel to the drive shaft extending longitudinally of the carrier body, the rear wheel drive transmission has the intermediate shaft and the running output shaft which is positioned approximately horizontally away therefrom, so that the transmission can be in a flat form having a reduced height. A space is therefore available between the load carrying platform and the transmission although the transmission is positioned at a sufficient distance from the ground. The power take-off device is mounted on the top of a case of the transmission, and a power take-off gear coupled to the PTO (power take-off) shaft of this device is disposed in a space between the drive shaft and the platform. This obviates the need to position the bottom wall of a platform rear portion at a higher level and to provide a space specifically for the power take-off device, permitting the rear wheels to be arranged at a rearward portion of the body. Since the engine can be positioned at a low level, the platform can also be at a low level. The arrangement described therefore assures the carrier of improved running stability.

Other objects, features and advantages of the present invention will become more apparent from the following description with reference to the accompanying drawings. The embodiment to be described below can be modified variously without departing from the scope of the invention as defined in the appended claims.

DESCRIPTION OF THE PREFERRED EMBODIMENT

Figure 1:
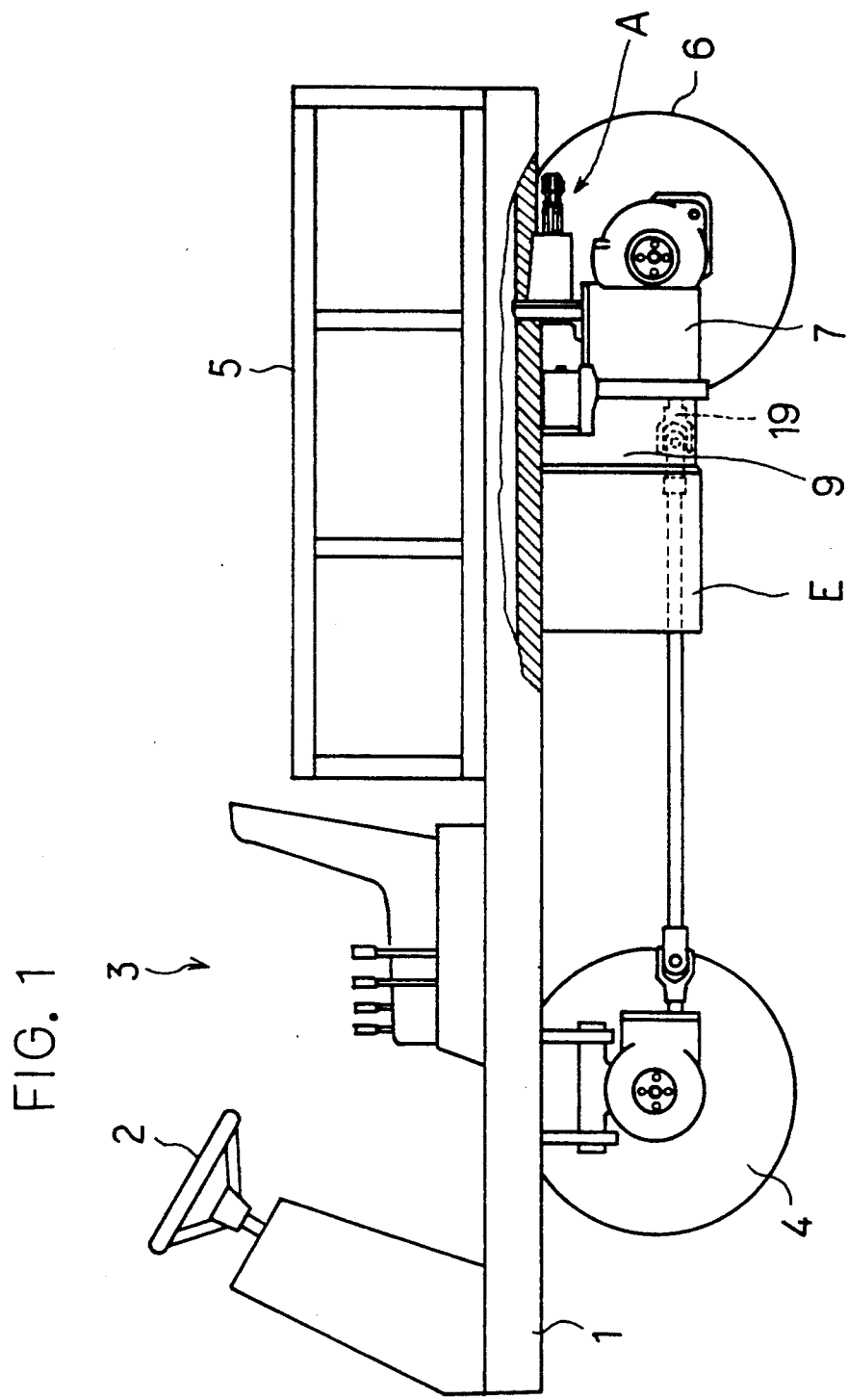
FIG. 1 is an overall side elevation of a carrier provided with a power take-off device of the invention.

The construction of an embodiment will be described with reference to the accompanying drawings. With reference to FIG. 1 showing the overall construction, a chassis 1 is provided with a steering column extending upward from its front end and having a steering wheel 2 projecting from the column. Disposed to the rear of the wheel 2 is driver's seat 3, below which front wheels 4 are arranged. The chassis 1 has a load carrying platform 5 on its rear portion. Arranged below the platform 5 are rear wheels 6, a transmission case 7 for transmitting power to the rear wheels 6, a clutch housing 9 in front of the case, and an engine E in front of the housing. The power take-off device A of the invention is mounted on the transmission case 7.

Figure 2:
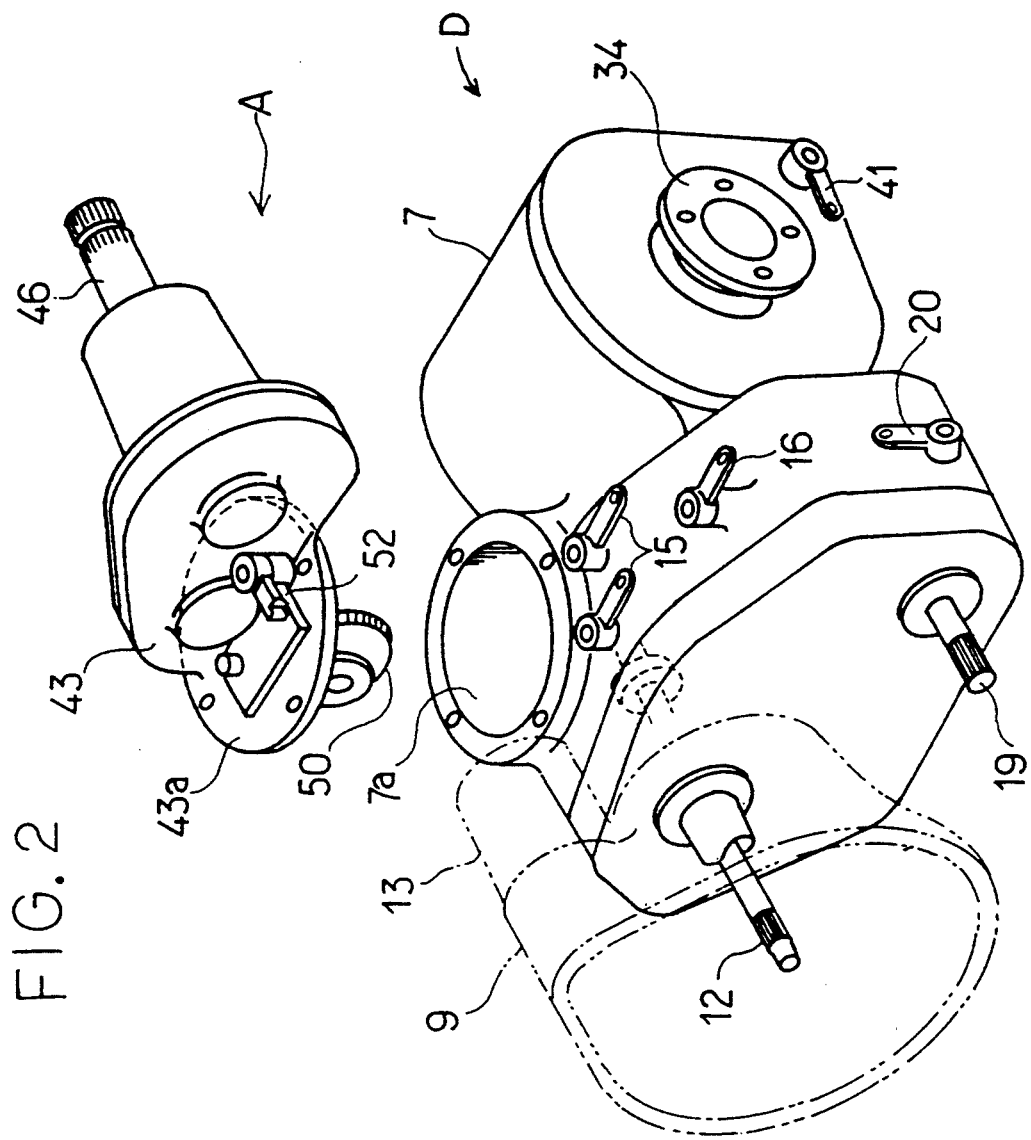
FIG. 2 is a perspective view showing a transmission case and the power take-off device as separated therefrom.
Figure 3:
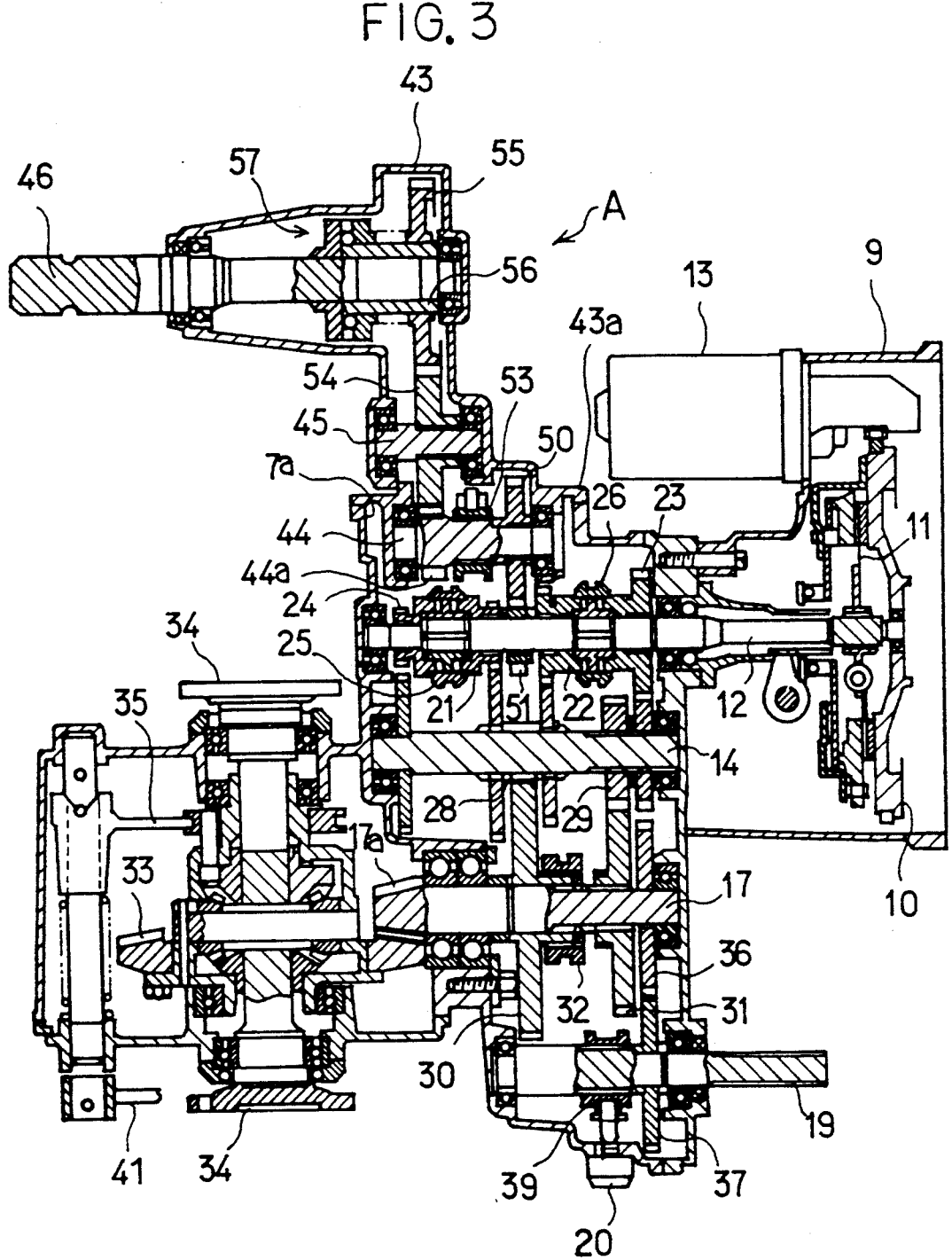
FIG. 3 is a view showing, as developed on a plane, the arrangement of shafts coupled to one another in the transmission and the power take-off device.
Figure 4:
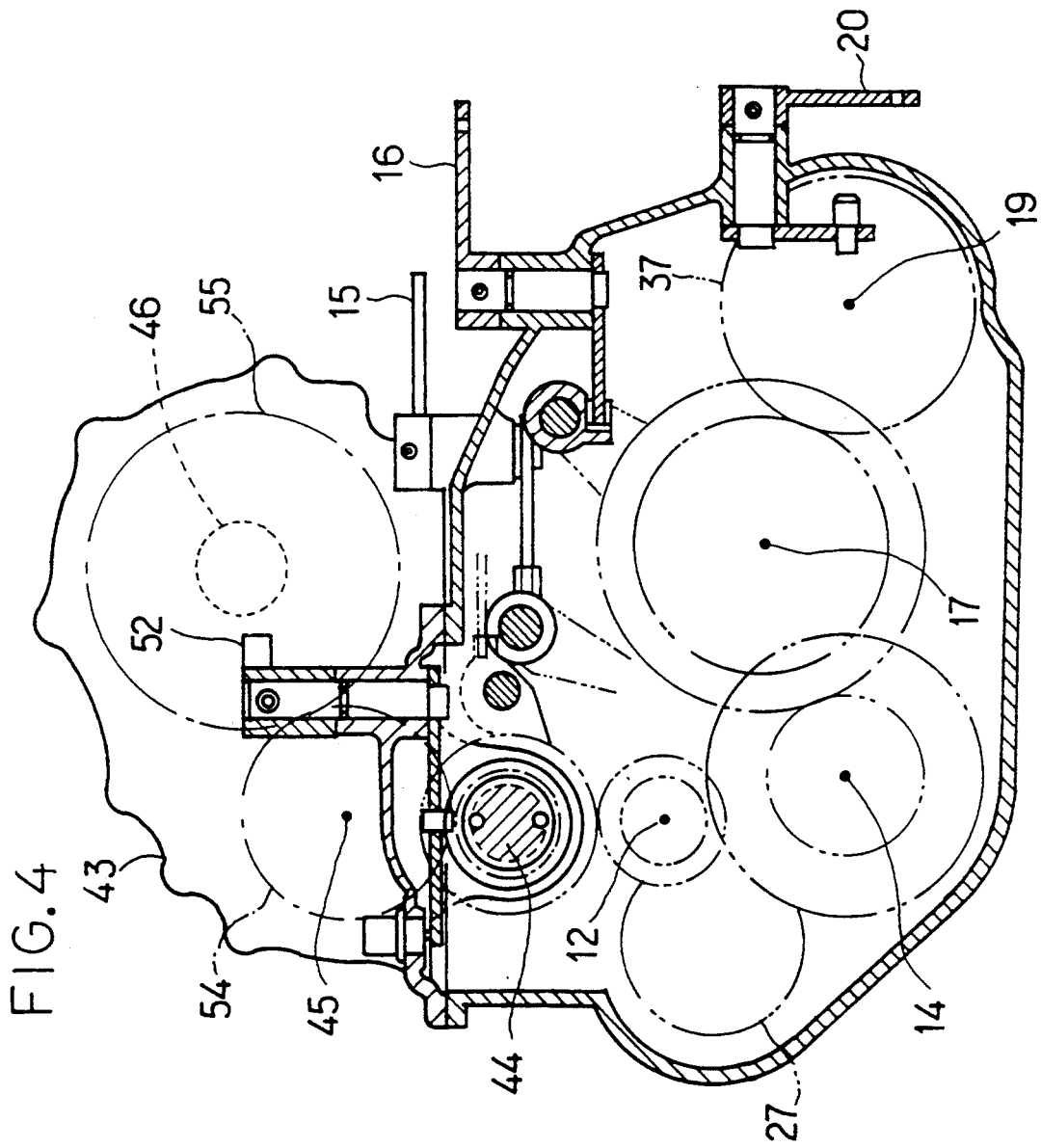
FIG. 4 is a front view in vertical section showing the transmission and the power take-off device as connected thereto.

With reference to FIGS. 2, 3 and 4, the outer end of crankshaft of the engine E is connected to a flywheel 10 within the clutch housing 9, and the flywheel 10 delivers power to a drive shaft 12 via a clutch disk 11. Indicated at 13 is a self-starting motor for rotating the flywheel 10 for starting the engine. Main change gears and a power take-off gear are mounted on the drive shaft 12. The main change gears are a first speed gear 21, second speed gear 22, third speed gear 23 and reverse gear 24 which are freely rotatably fitted to the shaft 12. The first speed gear 21, second speed gear 22 and third speed gear 23 are in mesh with gears on an intermediate shaft 14, while the reverse gear 24 is coupled to a gear on the intermediate shaft 14 by an idle gear 27 (FIG. 4). One of slide gears 25, 26 on the drive shaft 12 is slidingly shifted by turning the corresponding one of main change levers 15 (FIG. 2), whereby an inner toothed portion of the shifted slide gear 25 or 26 is brought into meshing engagement with one of the change gears on the drive shaft 12 to transmit the power from the drive shaft 12 to the intermediate shaft 14. Gears 28, 29 on the intermediate shaft 14 are in mesh with auxiliary change gears 30, 31 mounted on a wheel driving output shaft 17. An auxiliary change lever 16 (FIG. 2), when turned, slidingly shifts a slide gear 32 on the output shaft 17, whereby one of two inner toothed portions of the gear 32 is meshed with one of the auxiliary change gears 30, 31 to transmit the power from the intermediate shaft 14 to the output shaft 17.

The output shaft 17 is formed at its one end with a pinion 17a, which is in mesh with a differential gear 33 to transmit the power to axles 34 via a differential unit D. Indicated at 35 is a shifter arm for locking the differential unit D. A pin is fitted into a bevel gear for differential locking by turning a differential lever 41 (FIG. 2). An output gear 36 for driving the front wheels 4 is fixedly mounted on the running output shaft 17 and is in mesh with a gear 37 freely rotatably mounted on a front wheel drive shaft 19. A slide gear 39 on the drive shaft 19 has an inner toothed portion, which is meshable with the gear 37 by turning a change-over lever 20 (FIG. 2) to transmit the power to the front wheel drive shaft 19. Indicated at 40 is a switch for detecting whether the front wheels are driven.

The power take-off device A is removably attached to the top of the case 7 of the transmission having the foregoing construction. The power take-off gear 51 is fixedly mounted on the drive shaft 12 supported by an upper portion of the transmission case 7 transversely thereof. The upper wall of the case 7 opposed to the power takeoff gear 51 is formed with an opening portion 7a, through which the lower portion of the power take-off device A is insertable into the case 7. A PTO (power take-off) input shaft 44, intermediate shaft 45 and PTO shaft 46 extend transversely of and are supported by a case 43 for the device A. The PTO input shaft 44 is supported by the lowermost portion of the power take-off case 43, and a flange portion 43a provided around the case 43 above the shaft 44 can be fixed to the opening portion 7a of the transmission case 7. The lower portion of the power take-off device having the PTO shaft 44 is inserted into the case 7. An input gear 50 freely rotatably mounted on the PTO input shaft 44 then meshes with the power take-off gear 51.

A slide gear 53 is further fitted around the PTO input shaft 44. A PTO change-over lever 52 (FIG. 2) provided on the outer side of the power take-off case 43, when turned, shifts the slide gear 53, whereby an inner toothed portion of the slide gear 53 is meshed with the input gear 50 to effect power transmission. The PTO input shaft 44 is further integrally formed with a gear 44a in mesh with an intermediate gear 54 fixedly mounted on the intermediate shaft 45. The intermediate gear 54 is also in mesh with a fixed gear 55 on a mount shaft 56 freely rotatably fitted around the PTO shaft 44. One end of the mount shaft 56 opposite to the other end thereof carrying the gear 55 is provided with a reverse rotation preventing clutch 57 for preventing the PTO shaft 46 from driving some of the foregoing components by reverse power transmission toward the power take-off gear 51, whereby power is transmitted to the PTO shaft 46 via the clutch 57. When the power take-off device A is not attached to the transmission case 7, the power take-off case 43 is removed by removing bolts, and the opening portion 7a is covered with a closure.

We claim:
1. A carrier comprising:
a longitudinal body frame having a rear portion,
a load carrying platform disposed on the rear portion of the body frame,
a rear wheel driving transmission disposed below the platform with a clearance formed between the body frame and the transmission, wherein the transmission comprises
 (a) a drive shaft extending longitudinally of the body frame of the carrier,
 (b) an intermediated shaft disposed of a horizontal height below the drive shaft in parallel thereto and operatively connected to the drive shaft,
 (c) a wheel driving output shaft positioned at approximately the same horizontal height of and away from the intermediated shaft in parallel thereto and operatively connected to the intermediate shaft, and
 (d) a power take-off gear rotatable with the drive shaft,
a clutch and an associated engine arranged to a front of the transmission, the clutch being connected to the drive shaft of the transmission, and
a power take-off device being provided in the clearance between the body frame and the transmission and comprising
 (a) an input shaft coupled to the power take-off gear of the transmission, and
 (b) an output shaft for an external device operatively connected to the input shaft.

2. A carrier as defined in claim 1 wherein the power take-off device is removably attached to the transmission.

3. A carrier as defined in claim 2 wherein the transmission is provided with a casing having an opening in a top portion thereof opposed to the power take-off gear, and the power take-off device is provided with a casing having an attaching portion at a lower part thereof corresponding in position to the input shaft, the attaching portion being in register with the opening when the two casings are vertically joined together to couple the input shaft to the power take-off gear through the opening.

4. A carrier as defined in claim 3 wherein the input shaft has at least one gear meshable with the power take-off gear.

5. A carrier as defined in claim 3 wherein the attaching portion of the power take-off device is a flange covering an edge portion of the casing defining the opening.

* * * * *